(12) United States Patent
Parker

(10) Patent No.: US 8,423,625 B2
(45) Date of Patent: Apr. 16, 2013

(54) SESSION MANAGEMENT USING A CUSTOMIZED PILOT PACKET FOR STATEFUL DEVICES

(75) Inventor: Benjamin J. Parker, Vacaville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 97 days.

(21) Appl. No.: 13/179,742

(22) Filed: Jul. 11, 2011

(65) Prior Publication Data

US 2012/0221676 A1 Aug. 30, 2012

Related U.S. Application Data

(63) Continuation-in-part of application No. 13/036,613, filed on Feb. 28, 2011.

(51) Int. Cl.
*G06F 15/16* (2006.01)
(52) U.S. Cl.
USPC ........... 709/217; 709/219; 709/203; 709/228; 709/233; 709/223; 455/423; 455/435.1; 455/432.1; 370/352; 370/310; 370/328

(58) Field of Classification Search .................. 709/217, 709/219, 203, 228, 233, 223, 230; 455/435.1, 455/432.1, 423; 370/352, 310, 328
See application file for complete search history.

(56) References Cited

U.S. PATENT DOCUMENTS

| | | | |
|---|---|---|---|
| 7,454,206 B1 * | 11/2008 | Phillips et al. | 455/435.1 |
| 7,610,396 B2 * | 10/2009 | Taglienti et al. | 709/233 |
| 7,787,879 B1 * | 8/2010 | Philips et al. | 455/435.1 |
| 2003/0009536 A1 * | 1/2003 | Henderson et al. | 709/219 |
| 2010/0154047 A1 * | 6/2010 | Roach et al. | 726/9 |
| 2012/0221674 A1 * | 8/2012 | Ritter et al. | 709/217 |

* cited by examiner

*Primary Examiner* — Jude Jean Gilles

(57) ABSTRACT

A system is configured to receive an indication that a user device is registered with a network; and generate, as a result of receiving the indication, one or more packets associated with one or more flows between the user device and one or more network devices, based on one or more prior flows between the user device and the network devices, where each of the packets identifies a respective period time during which each of the flows is to be valid. The system may also be configured to transmit the packets to the network devices, where transmitting the packets allows the network devices to establish the flows between the user device and the network devices, or discard or over-write information, stored in a memory, associated with the prior flows.

20 Claims, 7 Drawing Sheets

SESSION MANAGEMENT USING A CUSTOMIZED PILOT PACKET FOR STATEFUL DEVICES

REFERENCE TO RELATED APPLICATION

This application claims priority to U.S. patent application Ser. No. 13/036,613, filed Feb. 28, 2011, the entire content of which is hereby incorporated by reference.

BACKGROUND

Service provider networks transport network traffic associated with a variety of services, applications, and content. The service provider networks provide more and more services, applications, and content that are customized to user devices. The customized services, applications, and content may be based on usage habits, a user profile, etc. associated with the user devices. Additionally, the customized services, applications, and content may be based on information associated with the user devices, such as types of user devices, network addresses, etc. and/or context information associated with user devices, such as locations of the user devices, etc. Unfortunately, as the service provider networks transport more and more traffic, the service provider networks do not always have the capacity to process the traffic in a manner that provides customized services, applications, and content to the user devices.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a pilot packet, associated with a user device, to be customized to one or more network devices that receive flows from the user device. The term pilot packet, as used herein, may include a packet that is generated when a communication session is established with a user device. The pilot packet may store information, associated with the user device, that allows a network device, associated with a content provider, to generate content (e.g., advertising content, video content, etc.) that is customized for the user device.

The systems and/or methods described herein may enable a pilot application to use the pilot packet to notify a stateful network device, with which the user device communicates, of a state of a flow associated with the user device. The stateful network device may include a device, such as a firewall, a switch, a load balancer, a server device, etc. that establishes and/or maintains a communication session, with the user device, for a period of time. When the period of time expires, another session may be established in order to communicate with the user device. The notification of the state of the flow may allow the stateful network device to clear a memory (e.g., or a state table stored within the memory) of a flow that has expired, which may increase a quantity of active flows (e.g., unexpired flows) that can be processed by the stateful network device.

The systems and/or methods may enable the pilot packet to be used to generate one or more customized pilot packets to be transmitted to one or more stateful network devices. Each of the customized pilot packets may be customized to a respective protocol, standard, and/or format that are used by the one or more stateful network devices. The customized pilot packets may include information associated with the user device, information associated with application and/or services used by the user device, authentication information, etc. that may be used to establish and/or maintain flows with the one or more stateful network devices. The customized pilot packets may allow the flows to be established and/or maintained without re-authenticating and/or reestablishing a session with the user device, which may reduce a period of time and/or a quantity of network resources used to re-authenticate and/or reestablish the session with the user device.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
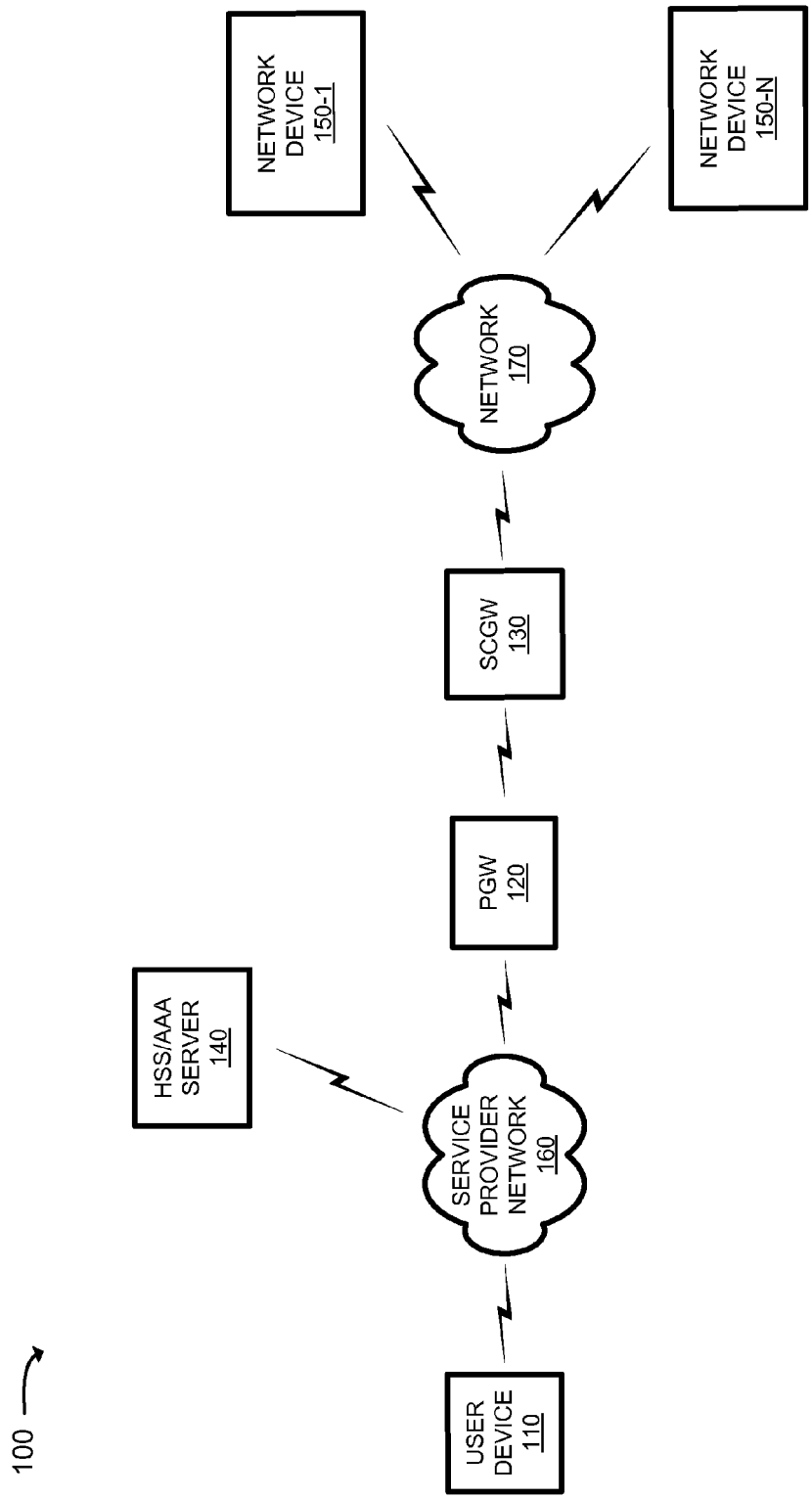
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a packet data network (PDN) gateway (PGW) device 120 (hereinafter referred to as a "PGW 120"), a service control gateway (SCGW) device 130 (hereinafter referred to as a "SCGW 130"), a home subscriber/authentication, authorization, and accounting server 140 (hereinafter referred to as a "HSS/AAA 140"), a group of network devices 150-1, . . . , 150-N (where N≧1) (hereinafter referred to collectively as "network devices 150" and individually as "network device 150"), a service provider network 160, and a network 170. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. For example, PGW 120 and SCGW 130 may be integrated into a single device. Alternatively, PGW 120, SCGW 130, and/or HSS/AAA 140 may be implemented as multiple, possibly distributed, devices.

Devices of environment 100 may interconnect via wired connections, wireless connections, or a combination of wired and wireless connections.

User device 110 may include any computation or communication device that is capable of communicating via service provider network 160. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a set top box (STB), a television, a camera, a personal gaming system, or another type of computation or communication device. The description to follow will generally refer to user device 110 as a wireless mobile communication device. The description is not limited, however, to a wireless mobile communication device and may equally apply to other types of user devices.

PGW 120 may include one or more network devices, or other types of computation or communication devices, that gather, process, search, store, and/or provide information in a manner described herein. For example, PGW 120 may include a gateway, a router, a switch, a firewall, a network interface card (NIC), a hub, a bridge, a proxy server, an optical add-drop multiplexer (OADM), or some other type of device that processes and/or transfers traffic (e.g., packets). In one example implementation, PGW 120 may include a device that aggregates traffic received from one or more user devices 110 and may send the aggregated traffic to network 170 and/or SCGW 130. In another example implementation, PGW 120 may receive traffic from network 170 and/or SCGW 130 and may send the traffic toward user device 110.

PGW 120 may perform network address translation (NAT) operations on user device 110. For example, PGW 120 may assign, to user device 110, an internal IP address (e.g., an IP address used by service provider network 160) and/or a range of ports (e.g., sometimes referred to as a port range and/or a port chunk), associated with the internal IP address. PGW 120 may also assign a public IP address to user device 110 that corresponds to the internal IP address and/or port range. The public IP address may be used by network 170 and/or devices with which PGW 120 communicates via network 170. PGW 120 may identify a time period (e.g., a lease) for which the internal IP address, port range, and/or public IP address are to be used.

PGW 120 may generate a pilot packet associated with user device 110. PGW 120 may store, within one or more fields associated with the pilot packet, the information associated with the NAT bindings. PGW 120 may store, in the one or more fields, information associated with user device 110, such as a device identifier (e.g., a mobile director number (MDN), a media access control (MAC) address, etc.) and/or a physical device identifier (e.g., an international mobile subscriber identity (IMSI), an international mobile equipment identity (IMEI), an electronic serial number (ESN), a mobile identification number (MIN), a mobile subscriber integrated services digital network (MSISDN) number, a national access identifier (NAI), etc.). PGW 120 may send the pilot packet to SCGW 130.

SCGW 130 may include one or more network devices that gather, process, search, store, and/or provide information in a manner described herein. For example, SCGW 130 may include a gateway, a router, a switch, a firewall, a NIC, a hub, a bridge, a proxy server, an OADM, or some other type of device that processes and/or transfers traffic. SCGW 130 may receive a pilot packet from PGW 120 and may obtain, from the pilot packet, information associated with user device 110.

SCGW 130 may use the information, associated with user device 110, to retrieve, from HSS/AAA 140, information, associated with a state of a flow and/or communication session, a usage history, a user profile, etc. that corresponds to user device 110. The information associated with the state of the flow may identify one or more flows associated with user device 110 (e.g., based on an access point name (APN), a port identifier, a flow identifier, etc.), a period of time that the flow is value, an indication that the flow has expired, etc.

The information, associated with the usage history, may identify with which network devices 150 (e.g., based on uniform resource locators (URLs), network addresses, device identifiers, etc.) user device 110 has previously communicated. The information associated with the usage history may identify applications, services, protocols, traffic types (e.g., email, instant messaging, calls, etc.) that were used by user device 110 when communicating with network devices 150. The information associated with the user profile may identify to which services and/or application user device 110 has subscribed. In another example, the user profile may identify information that a user, of user device 110, has authorized to be released, such as information associated with a location of user device 110, information associated with the user, authentication information associated with an application and/or service, etc.

SCGW 130 may use the pilot packet, received from PGW 120 to generate one or more customized pilot packets that correspond to one or more network devices 150. For example, SCGW 130 may generate a customized pilot packet, for network device 150, that is based on a protocol, standard, and/or format that is used and/or can be processed by network device 150. SCGW 130 may store, within the pilot packet, information associated with a flow between user device 110 and/or network device 150. The information associated with the flow may include information associated with an APN; a protocol, standard, and/or format; an application and/or service that is used by user device 110 when communicating with network device 150; login credentials associated with the application and/or service; etc. The information associated with the flow may also identify a period of time during which the flow is to remain valid. SCGW 130 may transmit the customized pilot packet to network device 150. SCGW 130 may use the pilot packet to generate other customized pilot packets for transmission to other network devices 150.

HSS/AAA 140 may include one or more server devices, or other types of computation or communication devices, that gather, process, search, store, and/or provide information in a manner similar to that described herein. For example, HSS/AAA 140 may manage and/or store, in a memory associated with HSS/AAA 140, the user profile associated with user device 110 that includes access point names (APNs) that are permitted for and/or accessible by user device 110, information associated with a user of user device 110 (e.g., a username, a password, a personal identification number (PIN), etc.), rate information, minutes allowed, and/or other information. APNs may identify particular applications, services, and/or data that are permitted for user device 110. HSS/AAA 140 may store information associated with a usage history of user device 110. Additionally, or alternatively, HSS/AAA 140 may perform AAA operations when registering user device 110 with service provider network 160.

Network device 150 may include one or more computation or communication devices that gather, process, search, store, transfer, and/or provide information in a manner similar to that described herein. In one example implementation, network device 150 may include a stateful device that communications with another device (e.g., user device 110) provided that a valid flow and/or communication session is established with the other device. Network device 150 may, in one example implementation, be a firewall device and/or a server device. In another example, network device 150 may be a switch and/or a node. In still another example implementation, network device 150 may be a load balancing device.

Network device 150 may, for example, determine that a state of a flow, associated with user device 110, indicates that the flow is not valid (e.g., when a period of time associated with the flow has expired). Based on the determination that the flow is not valid, network device 150 may not communicate with user device 110 unless a new flow and/or communication session is established with user device 110. Network device 150 may store, in a memory associated with network device 150, a state table that identifies flows being processed by network device 150 and a state associated with the flows (e.g., that indicates whether the flows are valid, not valid, or at a time during which the flows are valid). Network device 150 may remove entries from the state table when flows are determined not to be valid and/or may add entries when new flows are established. Network device 150 may update the flow table based on customized pilot packets received from SCGW 130 and/or may send a query, to SCGW 130, to identify states of flows identified in the state table.

Service provider network 160 may include one or more wired and/or wireless networks via which user devices 110 communicate and/or receive content. For example, service provider network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 160 may include a wide area network (WAN), a metropolitan area network (MAN), an ad hoc network, an intranet, a fiber optic-based network, and/or a combination of these or other types of networks.

Network 170 may include one or more wired and/or wireless networks. For example, network 170 may include a cellular network, the PLMN, a 2G network, a 3G network, a 4G network (e.g., a LTE network), a 5G network, and/or another network. Additionally, or alternatively, network 170 may include a WAN, a MAN, a telephone network (e.g., the Public Switched Telephone Network (PSTN)), an ad hoc network, an intranet, the Internet, a fiber optic-based network, and/or a combination of these or other types of networks.

Figure 2:
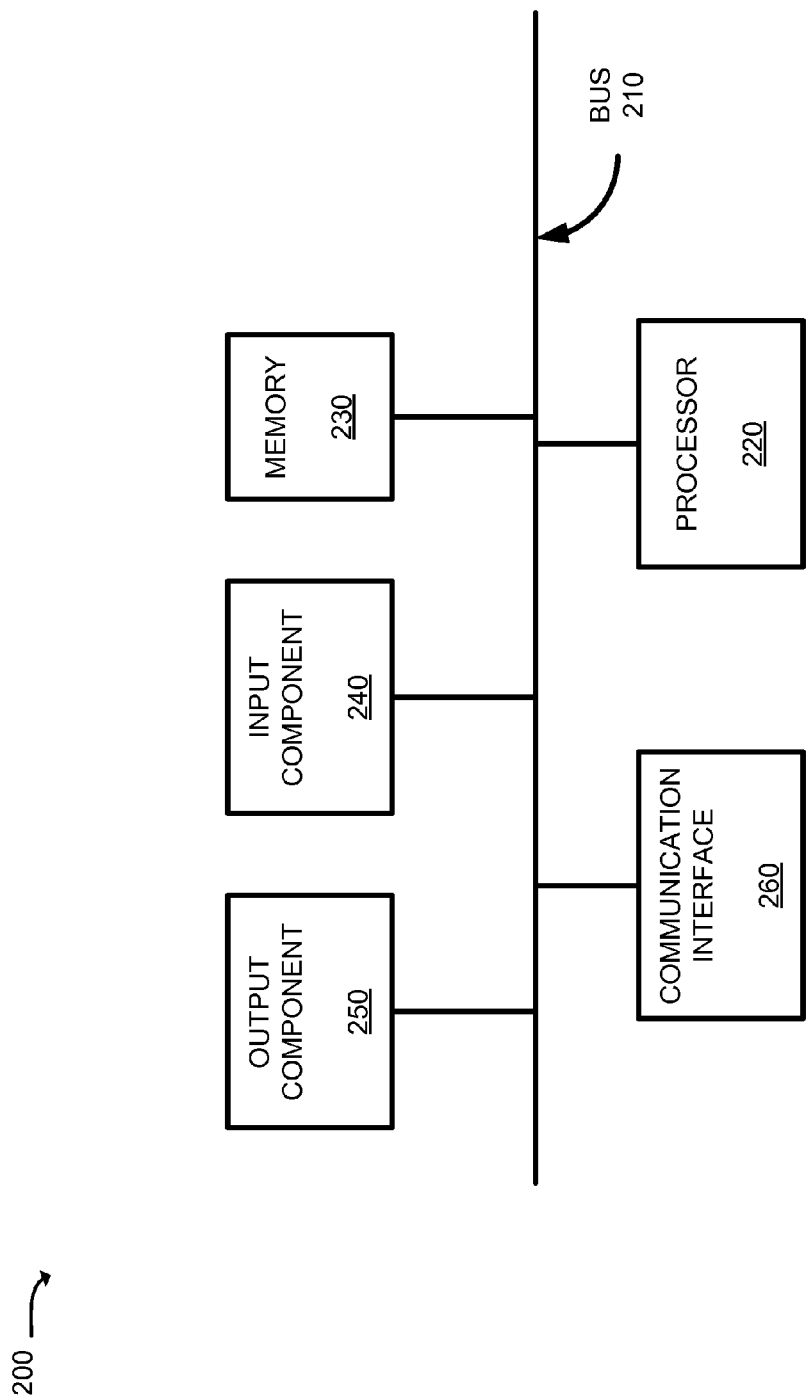
FIG. 2 is a diagram of example components of one or more of the devices of FIG. 1.

FIG. 2 is a diagram of example components of a device 200 that may correspond to user device 110, PGW 120, SCGW 130, HSS/AAA 140, and/or network device 150. Alternatively, each of user device 110, PGW 120, SCGW 130, HSS/AAA 140, and/or network device 150 may include one or more devices 200. Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include one or more processors, microprocessors, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as service provider network 160 and/or network 170. In one alternative implementation, communication interface 260 may be a logical component that includes input and output ports, input and output systems, and/or other input and output components that facilitate the transmission of data to other devices.

As described herein, device 200 may perform certain operations associated with generating or using a customized pilot packet. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
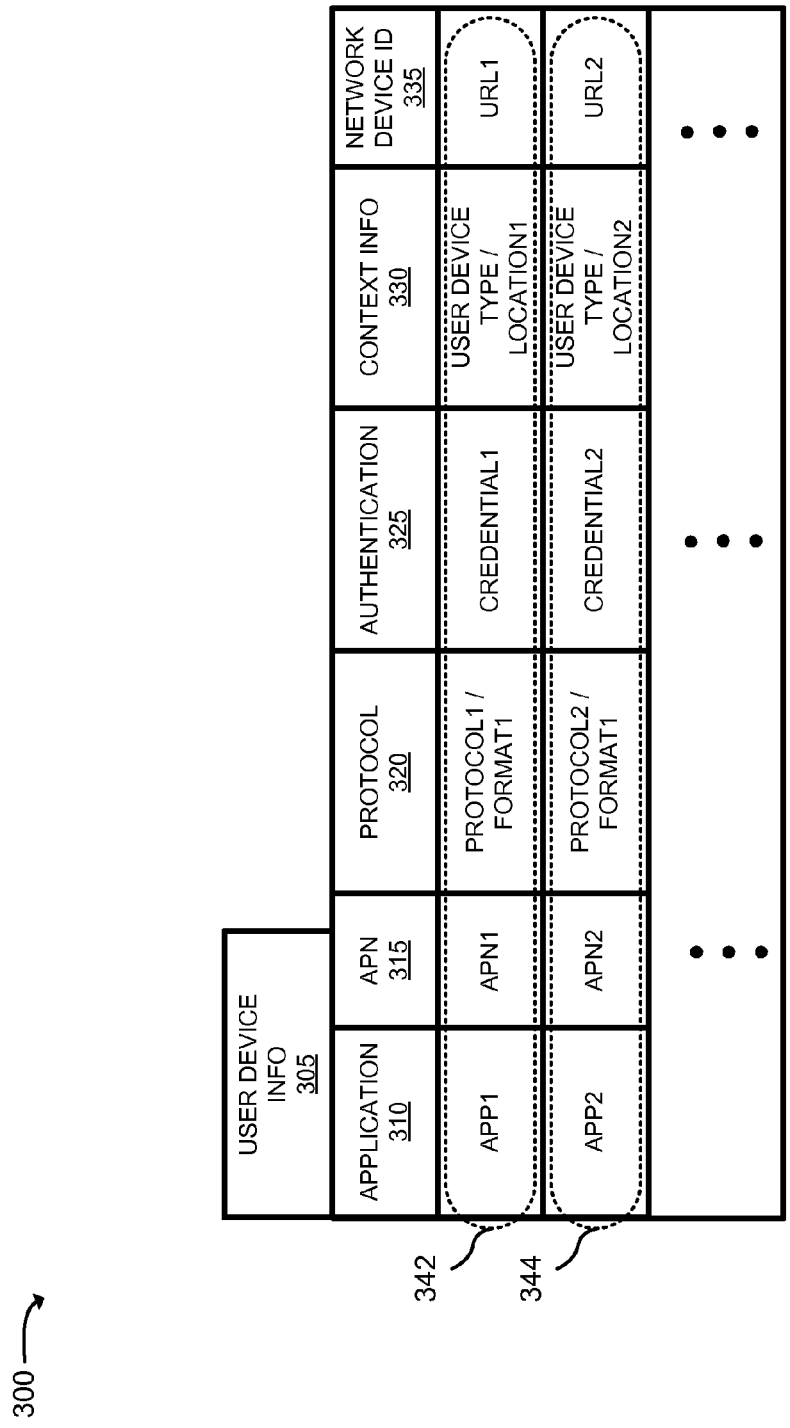
FIG. 3 is a diagram of an example data structure for storing information, regarding flows, associated with a user device according to an implementation described herein.

FIG. 3 is a diagram of an example data structure 300 (hereinafter referred to as "flow data structure 300") for storing information that corresponds to flows associated with user device 110, according to an implementation described herein. Flow data structure 300 may store information that corresponds to current and/or previous flows between user device 110 and one or more network devices 150. Flow data structure 300 may be stored in a memory associated with SCGW 130. As illustrated in FIG. 3, flow data structure 300 may store a collection of fields, such as a user device information (info) field 305, an application field 310, an access point name (APN) field 315, a protocol field 320, an authentication field 325, a context information (info) field 330, and a network device identification (ID) field 335. Flow data structure 300 includes fields 305-335 for explanatory purposes. In practice, flow data structure 300 may include additional fields, fewer fields, different fields, and/or differently arranged fields than are described with respect to flow data structure 300.

User device info field 305 310 may store information associated with a particular user device 110. The information associated with the particular user device 110 may include a device identifier (e.g., a MDN, a MAC address, etc.), a physical device identifier (e.g., an IMSI, an IMEI, an ESN, a MIN, a MSISDN number, a NAI, etc.), etc. Application field 310 may identify an application and/or service that corresponds to a flow between the particular user device 110 and network device 150. The application and/or service may, for example, be accessed and/or used, by the particular user device 110, when communicating with network device 150 via the flow. APN field 315 may identify an APN that corresponds to the flow. For example, the APN may be associated with the application and/or service identified in application field 310 and/or may identify a port to be used that corresponds to the APN, etc.

Protocol field 320 may store information associated with a protocol (e.g., a transmission control protocol (TCP), a user datagram protocol (UDP), etc.) that is used, by the particular user device 110, to communicate with network device 150. In another example, protocol field 320 may store information associated with a data format and/or standard (e.g., associated with images, text, audio, video, email, messaging, etc.) that is used or can be processed by network device 150. Authentication field 325 may store authentication information, associated with the application and/or service identified in application field 310, which network device 150 may use to establish a flow with the particular user device 110. The authentication information may include, for example, information associated with a user of the particular user device (e.g., a username, a password, a personal identification number (PIN), etc.).

Context info field 330 may include unique information, associated with user device 110, that is used by network device 150, when providing a service and/or access to an application that is identified in application field 310. For example, context info field 330 may store information associated with a type of the particular user device 110, information associated with a location of the particular user device 110, and/or other information to be used to provide the service and/or access to an application. Network device ID field 335 may store information associated with network device 150 associated with a current and/or previous flow between the particular user device 110 and network device 150. The information associated with network device 150 may include, for example, a device identifier, a device address (e.g., an IP address, a MAC address, a URL, etc.).

For example, SCGW 130 may retrieve, from HSS/AAA 140, information associated with a usage history for user device 110 and may obtain information, associated with a flow, from the information associated with the usage history. SCGW 130 may, for example, store information, associated with a flow between user device 110 and network device 150, in flow data structure 300. SCGW 130 may store information associated with an application and/or service (e.g., APP1) and/or an APN (e.g., APN1) associated with the application (e.g., as shown by ellipse 342). SCGW 130 may store information associated with network device 150 (e.g., URL1) (e.g., a shown by ellipse 342). The time associated with the flow may correspond to a period of time before the flow expires, a future time when the flow expires, a previous time when the flow expired, etc. SCGW 130 may also store information associated with a protocol and/or format (e.g., protocol1/format1) associated with the flow and/or that can be processed by network device 150 (e.g., as shown by ellipse 342).

SCGW 130 may also retrieve, from HSS/AAA 140, information associated with a user profile associated with a user of user device 110 and may obtain information, associated with the flow, from the information associated with the user profile. For example, SCGW 130 may obtain, from the information associated with the user profile, authentication information that allows user device 110 to access and/or use the application and/or service. In another example, SCGW 130 may obtain, from the information associated with the user profile, context information that is used by the service and/or the application. SCGW 130 may store the authentication information (e.g., credential1) and/or the context information (e.g., user device type/location) in flow data structure 300 (e.g., as shown by ellipse 342). In another example, SCGW 130 may obtain context information, such as information associated with a location of user device 110, from service provider network 160. SCGW 130 may not store the authentication information and/or the context information, in flow data structure 300 when the information, associated with the user profile, indicates that the user does not authorize network device 150 to receive the authentication information and/or the context information. SCGW 130 may store, in flow data structure 300, other information for flows between user device 110 and other network devices 150 (e.g., as shown by ellipse 344).

Figure 4:
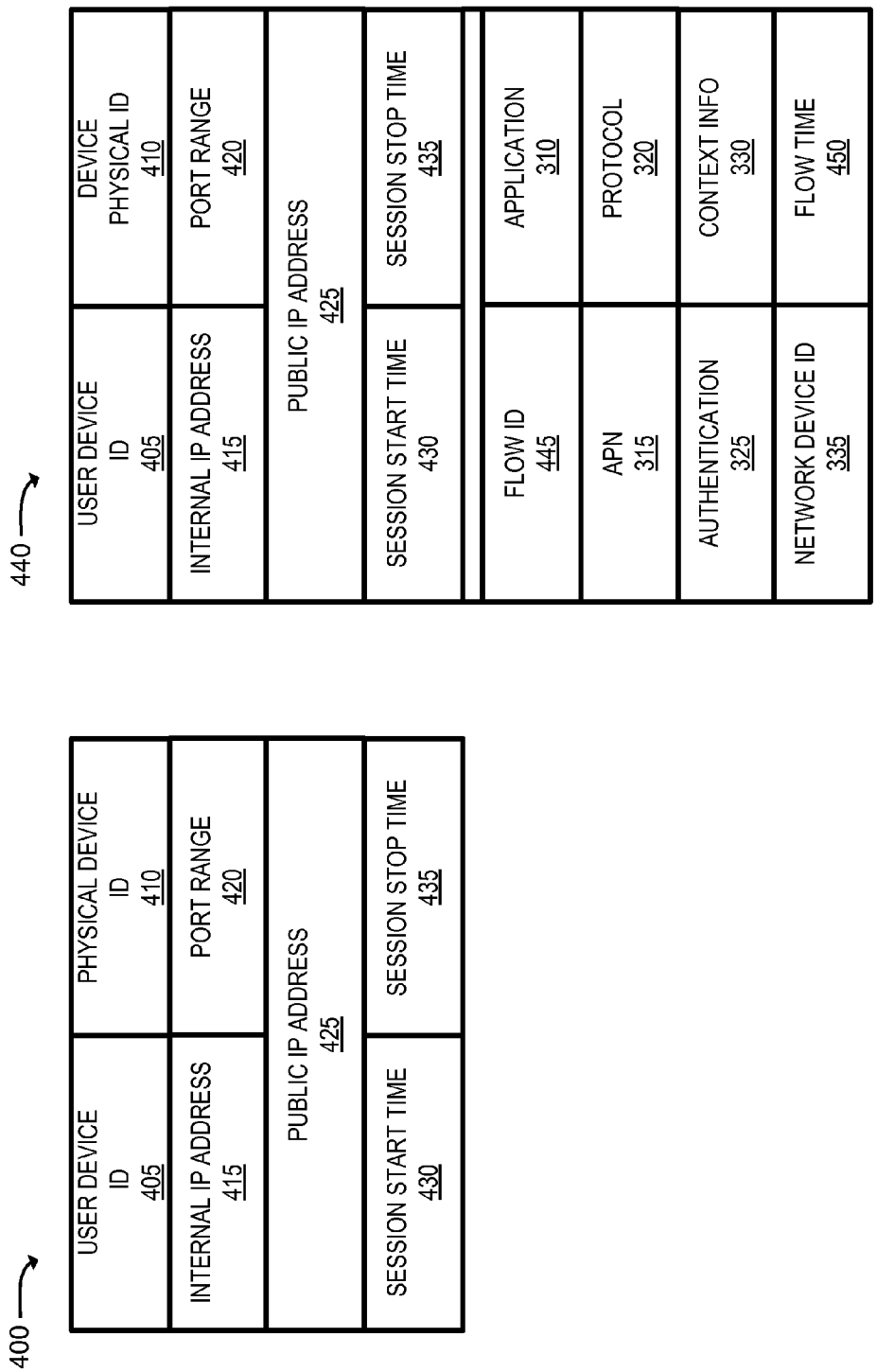
FIGS. 4A and 4B are example data structures associated with a pilot packet and/or a customized pilot packet, respectively, according to an implementation described herein.

FIG. 4A is a diagram of an example data structure 400 associated with a pilot packet (hereinafter referred to as "pilot packet data structure 400") according to an implementation described herein. PWG 120 may perform a NAT operation associated with user device 110 and may store information associated with user device 110 and/or information associated with NAT bindings in pilot packet data structure 400. As shown in FIG. 4A, pilot packet data structure 400 may include a collection of fields, such as a user device identifier (ID) field 405, a physical device identifier (ID) field 410, an internal IP address field 415, a port range field 420, a public IP address field 425, a session start time field 430, and a session stop time field 435. Pilot packet data structure 400 includes fields 405-435 for explanatory purposes. In practice, pilot packet data structure 400 may include additional fields, fewer fields, different fields, and/or differently arranged fields than are described with respect to pilot packet data structure 400.

User device ID field 405 may store a device identifier (e.g., a MDN, a MAC address, etc.) associated with a particular user device 110 for which a communication session is being established. Physical device ID field 410 may store a physical device identifier (e.g., an IMSI, an IMEI, an ESN, a MIN, a MSISDN number, a NAI, etc.) associated with the particular user device 110. Internal IP address field 415 may store an internal IP address associated with the particular user device 110. Port range field 420 may store one or more port identifiers associated with the internal IP address.

Public IP address field 425 may store a unique public IP address, associated with the particular user device 110, that corresponds to the internal IP address. Session start time field 430 may store a point in time when a session, associated with the particular user device 110, begins. Session stop time field 435 may store another point in time when the session expires.

FIG. 4B is an example data structure 440 (hereinafter referred to as "customized data structure 440), associated with a customized pilot packet, according to an implementation described herein. SCGW 130 may generate a customized pilot packet, destined for network device 150, based on customized data structure 440. SCGW 130 may, for example, generate the customized pilot packet, associated with a flow between user device 110 and network device 150, that is based on one or more of the fields associated with a pilot packet (e.g., associated with pilot packet data structure 400 of FIG. 4A) and/or information associated with the flow (e.g., stored flow data structure 300 of FIG. 3).

As shown in FIG. 4B, customized data structure 440 may include all or a portion of fields 405-435 of pilot packet data structure 400 of FIG. 4A and/or all or a portion of fields 310-340 of flow data structure 300 of FIG. 3. Additionally, or alternatively, customized data structure 440 may include a flow identification (ID) field 445 and a flow time field 450. Customized data structure 440 includes fields 310-340, 405- 435, 445, and 450 for explanatory purposes. In practice, customized data structure 440 may include additional fields, fewer fields, different fields, and/or differently arranged fields than are described with respect to customized data structure 440.

Flow ID field 445 may store information that uniquely identifies a particular flow between user device 110 and network device 150. For example SCGW 130 may generate a first customized pilot packet associated with a first flow, between user device 110 and network device 150, that corresponds to a first application (e.g., identified in application field 310) and/or a first APN (e.g., identified in APN field 315). SCGW 130 may store a first flow identifier, in flow ID field 445, that corresponds to the first flow. In another example, SCGW 130 may generate a second customized pilot packet associated with a second flow, between user device 110 and network device 150, that corresponds to a second application and/or a second APN. SCGW 130 may, in this example, store a second flow identifier, in flow ID field 445, that corresponds to the second flow. In yet another example, SCGW 130 may generate a third customized pilot packet associated with a third flow between user device 110 and another network device 150. SCGW 130 may, in this example, store a third flow identifier, in flow ID field 445, that corresponds to the third flow.

Flow time field 450 may identify a state of a flow (e.g., associated with a TCP, UDP, etc.) between the particular user device 110 and network device 150. The state of the flow may include a time when the flow begins and another time when the flow expires, and/or an indication whether the flow is valid (e.g., the flow has not expired) or is not valid (e.g., the flow has expired), etc.

Figure 5:
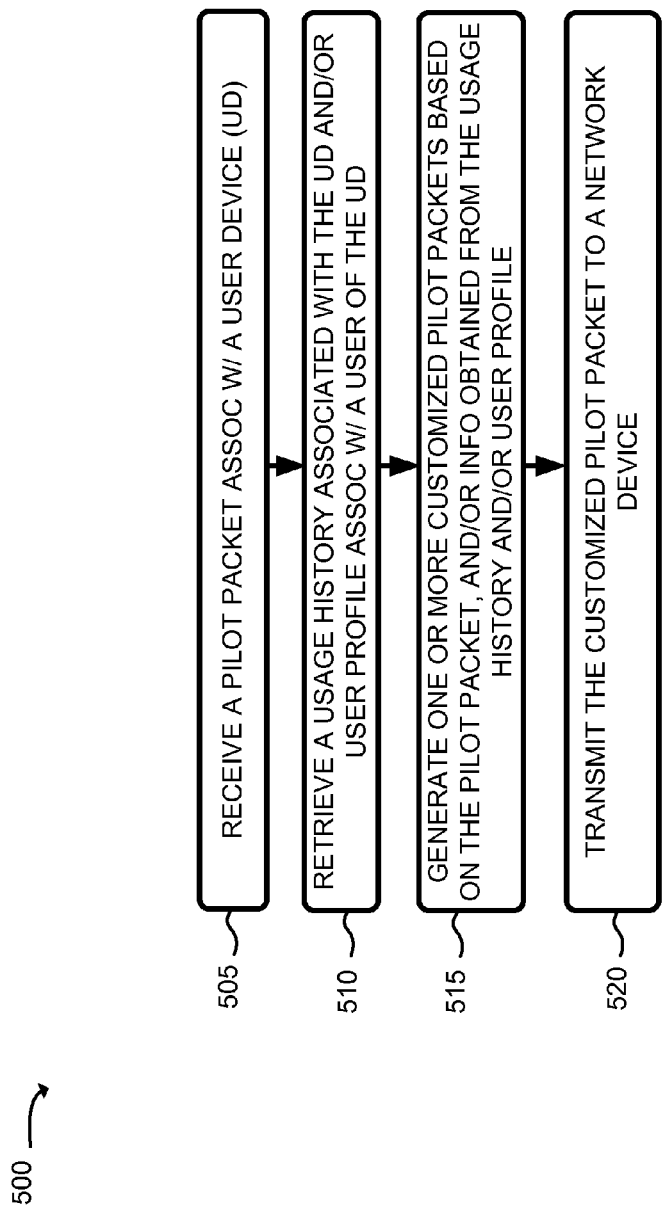
FIG. 5 is a flow chart of an example process for generating and/or using a customized pilot packet for a flow between a user device and a network device according to an implementation described herein.

FIG. 5 is a flow chart of an example process 500 for generating and/or using a customized pilot packet for a flow between user device 110 and network device 150 according to an implementation described herein. In one example implementation, process 500 may be performed by SCGW 130. In another example implementation, some or all of process 500 may be performed by a device or collection of devices separate from, or in combination with, SCGW 130.

As shown in FIG. 5, process 500 may include receiving a pilot packet associated with a user device (block 505). For example, user device 110 may send a registration request, to PGW 120, that includes information associated with user device 110, such as a device identifier (e.g., MDN, MAC address, etc.), and/or a physical device identifier (e.g., an IMSI, an IMEI, an ESN, a MIN, a MSISDN number, a NAI, etc.). PGW 120 may receive registration request and may perform a NAT operation on user device 110. PGW 120 may, for example, assign an internal IP address and/or a port range to user device 110. PGW 120 may create a NAT binding associated with user device 110, and may assign, to user device 110, a unique public IP address that is associated with the internal IP address and/or port range. PGW 120 may store, in a memory associated with PGW 120, information associated with the NAT binding.

PGW 120 may transmit, to user device 110, the internal IP address and/or one or more port identifiers associated with the port range. User device 110 may receive the internal IP address and/or the one or more port identifiers.

PGW 120 may use the information, associated with the NAT bindings and/or information, associated with user device 110, to generate a pilot packet associated with user device 110. For example, PGW 120 may store, in a data structure associated with the pilot packet (e.g., pilot packet data structure 400 of FIG. 4A), the information associated with the NAT binding (e.g., internal IP address, identifiers associated with the port range, the public IP address, etc.) that corresponds to user device 110. PGW 120 may, in another example, store information, associated with user device 110 (e.g., the device identifier, the physical device identifier, etc.), in the pilot packet. In yet another example, PGW 120 may store, in the pilot packet, a time when a session, associated with user device 110, is established and/or another time at which the session expires. The time when the session is established may correspond to a time when the registration request is received, when the internal IP address is transmitted to user device 110, when the pilot packet is generated, and/or some other time. PGW 120 may transmit the pilot packet to SCGW 130 and SCGW 130 may receive the pilot packet associated with user device 110.

As also shown in FIG. 5, process 500 may include retrieving a usage history that corresponds to a user device or a user profile for a user of the user device (block 510). For example, SCGW 130 may, as a result of receiving the pilot packet, retrieve, from HSS/AAA 140, a usage history that corresponds to user device 110. The usage history may, in a manner similar to that described above with respect to FIG. 3, include information associated with one or more flows between user device 110 and one or more network devices 150. For example, the usage history, for a particular flow, may identify an application and/or service that was accessed and/or used by user device 110 when communicating with network device 150. The usage history may identify an APN and/or port that correspond to the application and/or service. The usage history may identify a protocol and/or format used by network device 150 and/or may include information associated with network device 150, such as a device identifier, a network address (e.g., a URL, etc.).

In another example, SCGW 130 may communicate with HSS/AAA 140 to retrieve a user profile for a user of user device 110. The user profile may identify authentication information (e.g., login credentials, etc.) to be used to establish a flow with network device 150 and/or to enable user device 110 to access the application and/or service. The user profile may identify context information, associated with user device 110, that is used by the application and/or service (e.g., information associated with a type of user device 110, a location of user device 110, etc.). SCGW 130 may also obtain context information from service provider network 160, such as a current location associated with user device 110, etc. SCGW 130 may not use the authentication information and/ or the context information when the user profile includes an indication that use and/or distribution of the authentication information and/or the context information is not authorized by the user of user device 110.

As further shown in FIG. 5, process 500 may include generating one or more customized pilot packets, associated with user device 110, based on the pilot packet, and/or information obtained from the usage history and/or the user profile (block 515). For example, SCGW 130 may use the pilot packet to generate one or more customized pilot packets, associated with user device 110, using information associated with one or more flows, obtained from the usage history and/or the user profile. In one example, SCGW 130 may use the pilot packet to generate a customized pilot packet associated with a particular flow between user device and network device 150.

SCGW 130 may, in a manner similar to that described above with respect to FIG. 4B, store information, associated with the particular flow, in the pilot packet to create the customized pilot packet. For example, the information associated with the flow may include information that corresponds to an application and/or service, an APN associated with the application and/or service, a protocol associated with the flow, and/or information associated with network device 150. SCGW 130 may also store, in the pilot packet, authentication information that enables user device 110 to access the application and/or service, and/or network device 150. SCGW 130 may store context information, associated with user device 110, in the pilot packet, such as information associated with a type of user device 110, and/or information associated with a location of user device 110. Information associated with a current location of user device 110 and/or information associated with the type of user device 110 may, in another example, be obtained from service provider network 160.

SCGW 130 may also store, in the pilot packet, other information, such as a period of time that a flow, identified in the customized pilot packet is to remain valid (e.g. flow time 450 of FIG. 4B). SCGW 130 may store other information in the customized pilot packet that identifies a format to be used that conforms to a format that is supported by network device 150. In one example, SCGW 130 may convert the information, stored in the pilot packet, to a format, standard, and/or protocol that can be received and/or processed by network device 150.

SCGW 130 may, in a manner similar to that described above, use the pilot packet to generate other customized pilot packets using information associated with other flows, obtained from the usage history and/or the user profile. The information associated with the other flows may correspond to flows between user device 110 and network device 150 and/or between user device 110 and other network devices 150. The other customized pilot packets may be customized for network device 150 and/or the other network devices 150 based on the information associated with the other flows.

As further shown in FIG. 5, process 500 may include transmitting the customized pilot packet to a network device (block 520). For example, SCGW 130 may transmit the customized pilot packet to network device 150 and network device 150 may receive the customized pilot packet. Network device 150 may obtain, from the customized pilot packet, information associated with user device 110 and/or the information associated with the flow.

Network device 150 may, in one example, store an entry in a state table that includes all or a portion of the information associated with the flow obtained from the customized pilot packet. In another example, network device 150 may identify, within the state table, an entry associated with a prior flow, that corresponds to a portion of the information (e.g., the application, the APN, information associated with user device 110, etc.), associated with the flow, that was obtained from the customized pilot packet. Network device 150 may clear the entry (e.g., by discarding and/or over-writing the entry) and may store another entry based on the information, associated with the flow, obtained from the customized pilot packet. The other entry may include a period of time during which a flow, associated with the entry is to remain valid based on the period of time obtained from the customized pilot packet (e.g., based on the flow time 450 of FIG. 4B).

Network device 150 may, in another example, authenticate user device 110 based on the authentication information and/or the context information obtained from the information associated with the flow. The customized pilot packet may allow network device 150 to pre-establish a session and/or flow, associated with user device 110, which may reduce a quantity of time and/or network resources associated with setting up the flow between user device 110 and network device 150. Additionally, the customized pilot packet may enable entries, within the state table, associated with invalid and/or expired flows to be cleared and/or replaced with entries associated with valid and/or active flows.

SCGW 130 may also send other customized pilot packets, to network device 150, associated with other flows between user device 110 and network device 150, which may allow network device 150 to clear and/or replace other entries associated with other invalid and/or expired flows between user device 110 and network device 150. SCGW 130 may send further customized pilot packets, to other network devices 150, associated with further flows between user device 110 and the other network device 150. Sending the further customized pilot packets to the other network devices 150 may allow network device 150 to clear and/or replace entries associated with invalid and/or expired flows between user device 110 and the other network devices 150.

Figure 6:
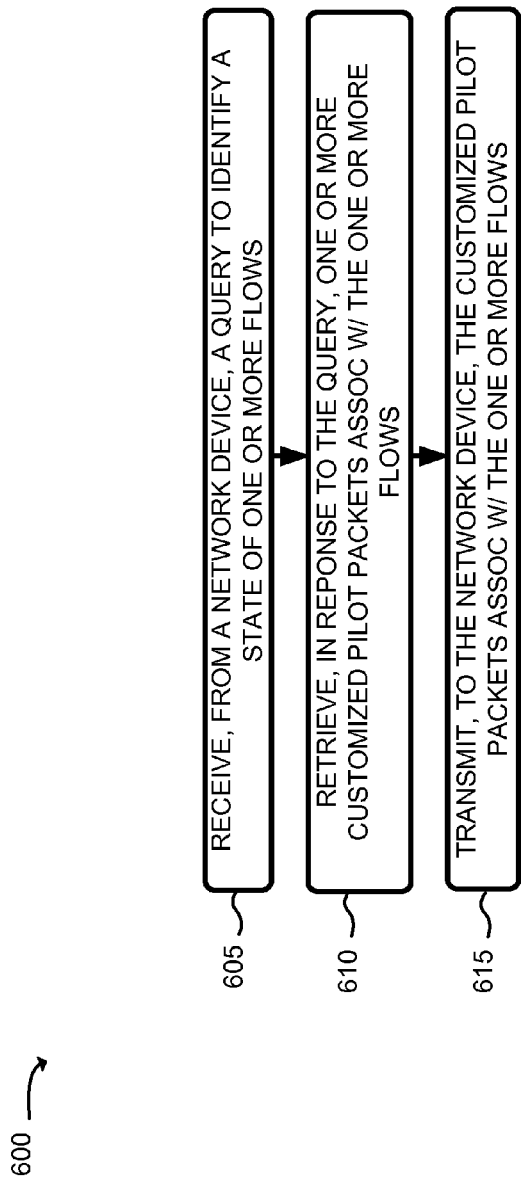
FIG. 6 is a flow chart of an example process for transmitting customized pilot packets associated with flows that are identified in a query received from a network device, according to an implementation described herein.

FIG. 6 is a flow chart of an example process 600 for transmitting customized pilot packets associated with flows that are identified in a query received from a network device, according to an implementation described herein. In one example implementation, process 600 may be performed by SCGW 130. In another example implementation, some or all of process 600 may be performed by a device or collection of devices separate from, or in combination with, SCGW 130.

As shown in FIG. 6, process 600 may include receiving, from a network device, a query to identify a state associated with one or more flows (block 605). For example, network device 150 may determine that a state table, that stores information associated with flows that are being received by network device 150 has reached capacity (e.g., based on a quantity of entries that is greater than a threshold). Base on the determination that the state table has reached capacity, network device 150 may transmit a query, to SCGW 130, to identify a respective state associated with the flows that are identified by the state table.

In another example, network device 150 may determine that one or more flows, identified in the state table, are idle and/or have expired. The one or more flows may be determined to be idle when traffic, associated with the one or more flows, has not been received for a period of time that is greater than another threshold. The one or more flows may be determined to be expired when respective times (e.g., flow times 405 of FIG. 4B), associated with the one or more flows, have expired. Based on the determination that the one or more flows are idle, and/or have expired, network device 150 may transmit, to SCGW 130, a query to determine a respective state for the one or more flows. The query may, in one example, include information associated with one or more user devices 110 to which the flows correspond. The information, associated with the one or more user devices 110 may include a respective device identifier (e.g., MDN, LDN, etc.), network address (e.g., IP address, port identifier, MAC address, etc.), a physical identifier (e.g., IMSI, IMEI, ESN, MIN, MSISDN, NAI, etc.), etc. SCGW 130 may receive the query from network device 150.

As also shown in FIG. 6, process 600 may include retrieving, in response to the query, one or more customized pilot packets associated with the one or more flows (block 610). For example, SCGW 130 may, in response to receiving the query, retrieve, from a memory associated with SCGW 130, one or more customized pilot packets, that were generated during a previous period of time, that correspond to user devices 110 identified in the query. Each of the customized pilot packets may store information, associated with the flows, between user devices 110 and network device 150, which may identify a respective period of time during which each flow is valid.

In another example implementation, SCGW 130 may retrieve information associated with the one or more flows that were previously used to generate customized pilot packets that were sent to network device 150. SCGW 130 may process the information associated with the one or more flows by converting the information, associated with the one or more flows, into a format that conforms to a format that can be processed by network device 150. SCGW 130 may store the processed information, associated with the one or more flows, in pilot packets, associated with user devices 110 identified in the query, to create the customized pilot packets. SCGW 130 may transmit the customized pilot packets to network device 150.

As also shown in FIG. 6, process 600 may include transmitting, to the network device, the customized pilot packets associated with the one or more flows (block 615). For example, SCGW 130 may transmit the customized pilot packets, retrieved from the memory, to network device 150 in response to the query. Network device 150 may receive the customized pilot packets and may use the flow information, obtained from the customized pilot packet to update the state table. For example, network device 150 may determine that flow information, obtained from a first customized pilot packet, indicates that a first flow has expired. Based on the determination that the first customized pilot packet indicates that the first flow has expired, network device 150 may clear an entry (e.g., by discarding and/or over-writing the entry), in the state table, that corresponds to the first flow. In another example, network device 150 may determine that flow information, obtained from a second customized pilot packet, indicates that a second flow has not expired. Based on the determination that the second customized pilot packet indicates that the second flow has not expired, network device 150 may not clear an entry that corresponds to the second flow.

Figure 7:
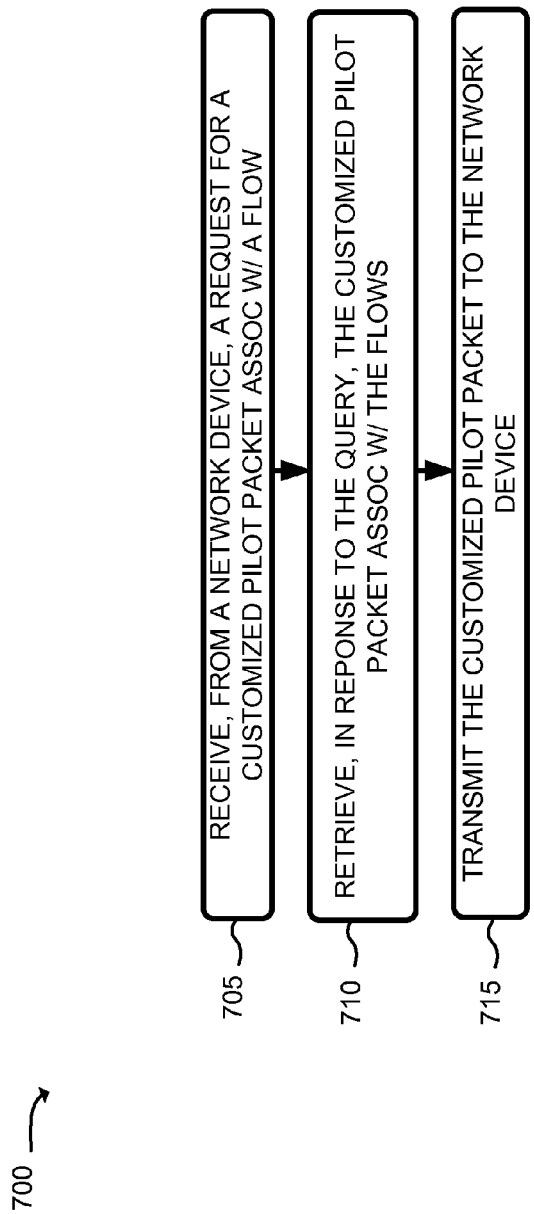
FIG. 7 is a flow chart of an example process for transmitting a customized pilot packet, to a network device, in response to a request for an updated customized pilot packet, according to an implementation described herein.

FIG. 7 is a flow chart of an example process 700 for transmitting a customized pilot packet, to a network device, in response to a request for a customized pilot packet, according to an implementation described herein. In one example implementation, process 700 may be performed by SCGW 130. In another example implementation, some or all of process 700 may be performed by a device or collection of devices separate from, or in combination with, SCGW 130.

As shown in FIG. 7, process 700 may include receiving, from a network device, a request for a customized pilot packet associated with a flow (block 705). For example, network device 150 may, query SCGW 130, for an updated customized pilot packet to obtain information associated with a flow between user device 110 and network device 150. The query may identify information, to be included in the customized pilot packet, to be used by network device 150 to determine whether to allow user device 110 to access the application and/or service. For example, the information to be included in the customized pilot packet may include current and/or up-to-date context information (e.g., information associated with a current location of user device 110, etc.), supplemental authentication information (e.g., such as credentials to permit access to banking application, a billing service, etc.), and/or other information associated with user device 110 and/or a user of user device 110. SCGW 130 may receive the query, for the customized pilot packet from network device 150.

In another example, network device 150 may determine that a flow, that is identified in a state table that is stored by network device 150 has expired or is about to expire. Base on the determination that the flow has expired or is about to expire, network device 150 may transmit a query, to SCGW 130, for an updated customized pilot packet. SCGW 130 may receive the query, for the customized pilot packet, from network device 150.

As also shown in FIG. 7, process 700 may include retrieving, in response to the query, the customized pilot packet associated with the flow (block 710). For example, SCGW 130 may, in one example and in response to receiving the query, retrieve, from a memory associated with SCGW 130, a copy of a customized pilot packet that was previously transmitted to network device 150.

In another example implementation, SCGW 130 may determine that another pilot packet, associated with user device 110, has been received from PGW 120. Based on the determination that the other pilot packet has been received from PGW 120, SCGW 130 may, in a manner similar to that described above with respect to blocks 510-515 of FIG. 5, generate another customized pilot packet associated with user device 110. For example, SCGW 130 may retrieve, from HSS/AAA 140, a usage history associated with user device 110 and/or a user profile associated with a user of user device 110. SCGW 130 may create another customized pilot packet by storing, in the other pilot packet, information associated with the flow (e.g., obtained from the usage history) and/or context information associated with user device 110 (e.g., obtained from the user profile). SCGW 130 may also store, in the other customized pilot packet, a time during with the flow is to remain valid.

In yet another example, SCGW 130 may query service provider network 160 to obtain information associated with a current location of user device 110 and may store the information associated with the current location in the customized pilot packet or the copy of the customized pilot packet. In still another example, SCGW 130 may obtain, from the user profile, other authentication information that allows user device 110 to access a particular application and/or service (e.g., such as a banking system, a billing system, etc.) associated with the flow. SCGW 130 may store the other authentication information in the other customized pilot packet or the copy of the customized pilot packet.

As further shown in FIG. 7, process 700 may include transmitting the customized pilot packet to the network device (block 715). For example, SCGW 130 may transmit the copy of the customized pilot packet and/or the other customized pilot packet to network device 150 in response to the query. Network device 150 may receive the copy of the customized pilot packet and/or the other customized pilot packet and may use the flow information, obtained from the copy of the customized pilot packet and/or the other customized pilot packet to update the state table.

For example, network device 150 may determine that the flow information, obtained from a copy of the customized packet includes a time that indicates that the flow has expired (e.g., when a current time is after a time that is included in the flow information). Based on a determination that the flow has expired, network device 150 may clear an entry in the state table that corresponds to the flow. If, however, network device 150 determines that the flow has not expired (e.g., when the current time is not after the time that is included in the flow information), then network device 150 may not clear the entry within the state table.

In another example, network device 150 may determine that the flow information, obtained from the other customized packet includes a time that the flow expires that is after another time that the flow expires that is stored in the state table. Based on a determination that the time that the flow expires is after the other time that the flow expires, network device 150 may over-write the other time that the flow expires, within the state table, with the time that the flow expires.

In yet another example, network device 150 may obtain, from the other customized pilot packet, the information associated with the current location of user device 110 and may use the information associated with a current location when providing user device 110 access to an application and/or a service. In still another example, network device 150 may obtain, from the other customized pilot packet, the other authentication information that allows network device 150 to authorize user device 110 to access the particular application and/or service when the user device 110 communicates with network 150.

Systems and/or methods, described herein, may enable a pilot packet, associated with a user device, to be customized to a network device that receives flows from the user device. The systems and/or methods may enable a customized pilot packet to be transmitted to a stateful network device to notify the network device of a state of a flow associated with the user device. The notification of the state of the flow may allow the network device to clear an entry in a state table that corresponds to a flow that has expired, which may increase a quantity of active flows (e.g., unexpired flows) that can be processed by the network device.

The systems and/or methods may enable a pilot packet to be used to generate one or more customized pilot packets to be transmitted to one or more stateful network devices. Each of the customized pilot packets may be customized to a respective protocol, standard, and/or format that is used by the one or more network devices. The customized pilot packets may include information associated with the user device, information associated with applications and/or services used by the user device, authentication information, etc. that may be used to establish and/or maintain flows with the one or more network devices. The customized pilot packets may allow the flows to be established and/or maintained without re-authenticating and/or reestablishing a session with the user device, which may reduce a period of time and/or a quantity of network resources used to re-authenticate and/or reestablish the session with the user device.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 5-7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by the device, a packet, associated with a user device, as a result of establishing a communication session between the device and the user device;
   obtaining, by the device, a usage history, associated with the user device, as a result of receiving the packet, where the usage history includes information associated with a previous flow of traffic between the user device and a network device;
   storing, by the device and in the packet to create a customized packet, the information associated with the previous flow and a time period that a flow is to be valid; and
   transmitting, by the device, the customized packet to the network device, where transmitting the customized packet allows the network device to establish a flow with the user device within a period of time that is less than another period of time associated with establishing the flow without the customized packet.

2. The method of claim 1, where the packet includes information associated with the communication session, where the information associated with the communication session includes at least one of:
   an internal Internet protocol (IP) address that is used by the device to communicate with the user device,
   a public IP address to be used by the network device when communicating with the user device, or
   a period of time that the communication session is valid.

3. The method of claim 1, where the information associated with the previous flow includes at least one of:
   information associated with an access point name (APN),
   information associated with an application or service, or
   information associated with the network device.

4. The method of claim 1, further comprising:
   obtaining information, associated with a user profile associated with a user of the user device, where the information associated with the user profile includes information that allows the network device to authenticate the user device.

5. The method of claim 4, where storing the information, associated with the previous flow, further includes:

storing, in the packet, the information that allows the network device to authenticate the user device.

6. The method of claim 1, where storing the information, associated with the previous flow, further includes:
converting the information associated with the previous flow to a format that can be processed by the network device.

7. The method of claim 1, where the network device stores a state table that allows the network device to manage other flows associated with the user device or another user device; and
where transmitting the customized packet, to the network device, allows the network device to:
clear an entry, in the state table, associated with the previous flow, or
store another entry, in the state table, associated with the flow.

8. The method of claim 1, further comprising:
obtaining, from the usage history, information associated with one or more other previous flows of traffic between the user device and one or more other network devices;
creating one or more other customized packets, associated with the one or more other previous flows; and
transmitting the one or more other customized packets to the one or more other network devices.

9. A device, comprising:
one or more processors to:
receive, from a network device, a request for packet associated with a flow of traffic between a user device and the network device,
retrieve, in response to the request, a copy of the packet, associated with the flow, that was previously transported to the network device, where the packet identifies a period of time that the flow is valid,
obtain information, associated with a user profile, for a user of the user device, that includes information that enables the user device to access an application or service associated with the flow,
modify the packet based on the information that enables the user device to access the application or service, and
transmit the modified packet, to the network device, where the modified packet allows the network device to one of:
determine whether the flow has expired based on the period of time and a current time, or
determine whether to authorize the user device to access the application or service based on the information that enables the user device to access the application or service.

10. The device of claim 9, where the one or more processors are further to:
receive another packet, associated with the user device, where the other packet is received as a result of previously registering the user device, and
generate the packet based on the other packet and at least one of:
information associated with a protocol that is used in a previous flow between the user device and the network device,
information associated with an access point name (APN) associated with the previous flow,
information associated with the network device, or
another period of time during which the previous flow was valid.

11. The device of claim 9, where, when modifying the packet, the one or more processors are further to:

convert the modified packet into a format that can be processed by the network device.

12. The device of claim 9, where, when transmitting the modified packet, the one or more processors are further to:
transmit the modified packet using a protocol that the network device can process.

13. The device of claim 9, where, when modifying the packet, the one or more processors are further to:
determine that the user profile includes an indication that permits the information, that enables the user device to access the application or service, to be transmitted to the network device, and
store, in the packet, the information that enables the user device to access the application or service based on the determination that the user profile includes the indication.

14. A non-transitory computer-readable medium containing one or more instructions executable by at least one processor, the computer-readable medium comprising:
one or more instructions to receive an indication that a user device is registered with a network;
one or more instructions to generate, as a result of receiving the indication, one or more packets associated with one or more flows between the user device and one or more network devices, based on one or more prior flows between the user device and the one or more network devices, where each of the one or more packets identifies a respective period of time during which each of the one or more flows is to be valid; and
one or more instructions to transmit the one or more packets to the one or more network devices, where the one or more instructions to transmit the one or more packets allow the one or more network devices to:
establish the one or more flows between the user device and the one or more network devices, or
discard or over-write information, stored in a memory, associated with the one or more prior flows.

15. The non-transitory computer-readable medium of claim 14, where the indication that the user device is registered with a network is included in another packet that stores information associated with a network address translation (NAT) operation that was performed, on the user device, when registering the user device with the network, and
where the information associated with the NAT operation includes at least one of:
a first Internet protocol (IP) address that is used by one of the one or more network devices,
a second IP address that is used by the network,
one or more port identifiers, associated with the second IP address, assigned to the user device, or
information associated with a time when the user device is to re-register with the network.

16. The non-transitory computer-readable medium of claim 15, where the one or more instructions to generate the one or more packets further include:
one or more instructions to generate one or more copies of another packet that correspond to the one or more network devices or the one or more flows;
one or more instructions to retrieve information associated with the one or more prior flows; and
one or more instructions to store the respective period of time or respective information, associated with each of the one or more prior flows, in each of the one or more copies of the other packet.

17. The non-transitory computer-readable medium of claim 16, further comprising:

one or more instructions to convert the information associated with each of the one or more prior flows to a respective format or standard that can be processed by each of the one or more network devices.

18. The non-transitory computer-readable medium of claim 14, where the one or more instructions to generate the one or more packets further include:
   one or more instructions to retrieve information that allows the user device to access an application or service associated with a flow, of the one or more flows, between the user device and one of the one or more network devices;
   one or more instructions to store, in a packet, of the one or more packets, the information that allows the user device to access an application or service; and
   one or more instructions to transmit the packet to the one of the one or more network devices.

19. The non-transitory computer-readable medium of claim 14, further comprising:
   one or more instructions to receive, from one of the one or more network devices, a request for information associated with at least one flow, of the one or more flows, between the user device and the one of the one or more network devices;
   one or more instructions to retrieve at least one packet, of the one or more packets, that corresponds to the at least one flow, of the one or more flows; and
   one or more instructions to transmit the at least one packet to the one of the one or more network devices, where the one or more instructions to transmit the at least one packet allows the one of the one or more network devices to:
      clear an entry, in a state table, that corresponds to the at least one flow when the at least one packet indicates that the at least one flow has expired, or
      preclude from clearing the entry when the at least one packet does not indicate that the at least one flow has expired.

20. The non-transitory computer-readable medium of claim 14, further comprising:
   one or more instructions to receive, from a particular network device, of the one or more network devices, a request for information associated with a flow, of the one or more flows, between the user device and the particular network device;
   one or more instructions to determine whether another indication, that the user device has been re-registered with the network, has been received;
   one or more instructions to transmit, to the particular network device, a packet, of the one or more packets, that was previously transmitted to the particular network device, when the other indication has not been received, where the packet identifies a first time that a flow, of the one or more flows, expires; and
   one or more instructions to transmit a modified version of the packet, that was previously transmitted to the particular network device, when the other indication has been received, where the modified version of the packet identifies a second time that the flow expires that is later than the first time.

\* \* \* \* \*